(12) United States Patent
Skolness

(10) Patent No.: US 7,624,814 B2
(45) Date of Patent: Dec. 1, 2009

(54) CRUST FRACTURING IMPLEMENT

(76) Inventor: Trygve Skolness, 10164 N. 70$^{th}$ Ave., Glyndon, MN (US) 56547

( * ) Notice: Subject to any disclaimer, the term of this patent is extended or adjusted under 35 U.S.C. 154(b) by 362 days.

(21) Appl. No.: 11/343,784

(22) Filed: Jan. 31, 2006

(65) Prior Publication Data
US 2007/0175644 A1 Aug. 2, 2007

(51) Int. Cl.
*A01B 5/00* (2006.01)
*A01B 7/00* (2006.01)
*A01B 21/02* (2006.01)
*A01B 35/16* (2006.01)
*A01B 35/28* (2006.01)

(52) U.S. Cl. ..................... 172/551; 172/572

(58) Field of Classification Search ............... 172/547, 172/546, 540, 609, 607, 606, 573, 572, 551, 172/627, 643, 520, 569, 624
See application file for complete search history.

(56) References Cited

U.S. PATENT DOCUMENTS

| 380,422 | A | 4/1888 | Clark |
| 570,828 | A | 11/1896 | Tracy |
| 1,405,860 | A | 2/1922 | Olson |
| 1,688,914 | A | 10/1928 | Ariens |
| 1,703,539 | A | 2/1929 | Ohlsen |
| 1,714,852 | A | 5/1929 | Denitson, Jr. |
| 1,884,720 | A | 10/1932 | Karl |
| 1,911,623 | A | 5/1933 | Karl |
| 2,244,099 | A | 6/1941 | Chase | |
| 2,575,321 | A | 11/1951 | Traver | 97/217 |
| 2,604,026 | A | 7/1952 | Latta | 97/212 |
| 3,080,004 | A * | 3/1963 | McNair | 172/587 |
| 3,213,946 | A * | 10/1965 | Carrick | 172/573 |
| 4,194,575 | A | 3/1980 | Whalen | 172/551 |
| 4,398,608 | A | 8/1983 | Boetto | 172/551 |
| 4,533,000 | A | 8/1985 | Van der Lely | 172/68 |
| 4,646,850 | A | 3/1987 | Brown et al. | 172/551 |
| 4,817,732 | A | 4/1989 | Brown et al. | 172/548 |
| 5,299,647 | A | 4/1994 | Mudd et al. | 172/555 |
| 5,419,402 | A * | 5/1995 | Heintzman | 172/551 |
| 5,461,995 | A | 10/1995 | Winterton | 111/139 |
| 5,620,055 | A | 4/1997 | Javerlhac | 172/604 |
| 6,119,608 | A | 9/2000 | Peterson et al. | 111/192 |
| 6,223,663 | B1 | 5/2001 | Wendling et al. | 111/139 |
| 6,669,612 | B2 * | 12/2003 | Jager | 492/30 |

* cited by examiner

*Primary Examiner*—Christopher J. Novosad
(74) *Attorney, Agent, or Firm*—Westman, Champlin & Kelly, P.A.

(57) ABSTRACT

An apparatus for fracturing a crust on an agricultural field includes a tool bar and a support attached to the tool bar. A plurality of discs are non-rotatably attached to an axle that is rotatably supported by the support. Each of the plurality of discs include a plurality of spaced apart teeth about the perimeter of each disc. The teeth comprise convex surfaces and concave surfaces that converge at distal ends where the plurality of discs rotate about the support such that the convex surfaces penetrate and fracture the crust and that any debris or trash picked up by the teeth is ejected by the angles of the teeth and angles of the support brackets preventing plugging and destruction of the rowed crop.

17 Claims, 5 Drawing Sheets

CRUST FRACTURING IMPLEMENT

BACKGROUND OF THE INVENTION

The present invention relates to a farm implement. More particularly, the present invention relates to a farm implement that fractures a crust on soil.

A typical method of preparing a field for planting crops includes using a moldboard plow or a chisel plow to work the ground after a harvest to bury crop residue and other debris in the soil. The following spring a seed bed is prepared in the field by tilling the soil and thereby loosening the soil, breaking up clumps of dirt and also leveling the surface. After the seed bed is prepared the crops are planted, typically in rows.

Another method of planting crops includes a "no-till" method. Using a no-till method includes leaving the soil unworked from the previous season with the crop residue or debris remaining on the surface of the field. Prior to planting the crop, the soil is tilled, typically with a tandem disc implement to cut the debris and prepare the seed bed. The crops are planted into the soil through the debris where the debris aids in preventing erosion.

A hazardous time for the seedlings occurs when a rain falls on the seed bed and creates a crust. If the crust is sufficiently thick, the seedlings may not be able to penetrate the crust and may subsequently die in the ground. If the seedlings is able to penetrate the crust, fine soil particles on top of the crust may be blown by the wind which may also harm the seedlings.

Typical farm implements that have been used to fracture the crust on a recently planted field include a rotary hoe. A rotary hoe includes a number of discs that have teeth around the perimeter. The teeth have at least one concave surface and another surface that typically form a point at a distal end. As the discs rotate the point and the concave surface penetrate, fracture and lift the crust such that if the seedlings find the penetrated, fractured and lifted crust, they are able to emerge to the surface. The rotary hoe also creates an uneven surface such that the fine particles are not blown into the seedlings.

However as the teeth rotate out of the soil, the concave surface has a tendency of carrying debris such as stocks or other crop residue, sticks, wire and/or rocks out of the soil and into an entanglement with other discs. The entanglement of the debris with the discs causes the discs to stop rotating and cease effectively breaking the crust. To remove the entanglement, the farmer must stop the tractor used to tow the rotary how, and manually remove the entanglement. Having to stop the tractor causes the farmer to use more time than necessary to work the field and thereby causes ineffcencies.

SUMMARY OF THE INVENTION

The present invention includes an apparatus that is used to fracture a crust on an agricultural field. The apparatus includes a support that attaches to a tool bar. The support rotatably supports an axle having a plurality of discs non-rotatably attached to the axle. Each disc includes a plurality of spaced apart teeth about a perimeter of each disc. The teeth comprise convex surfaces and concave surfaces that converge at distal ends. The plurality of discs rotate about the support in a direction such that the distal end and the convex surfaces engage the crust.

DETAILED DESCRIPTION

Figure 1:
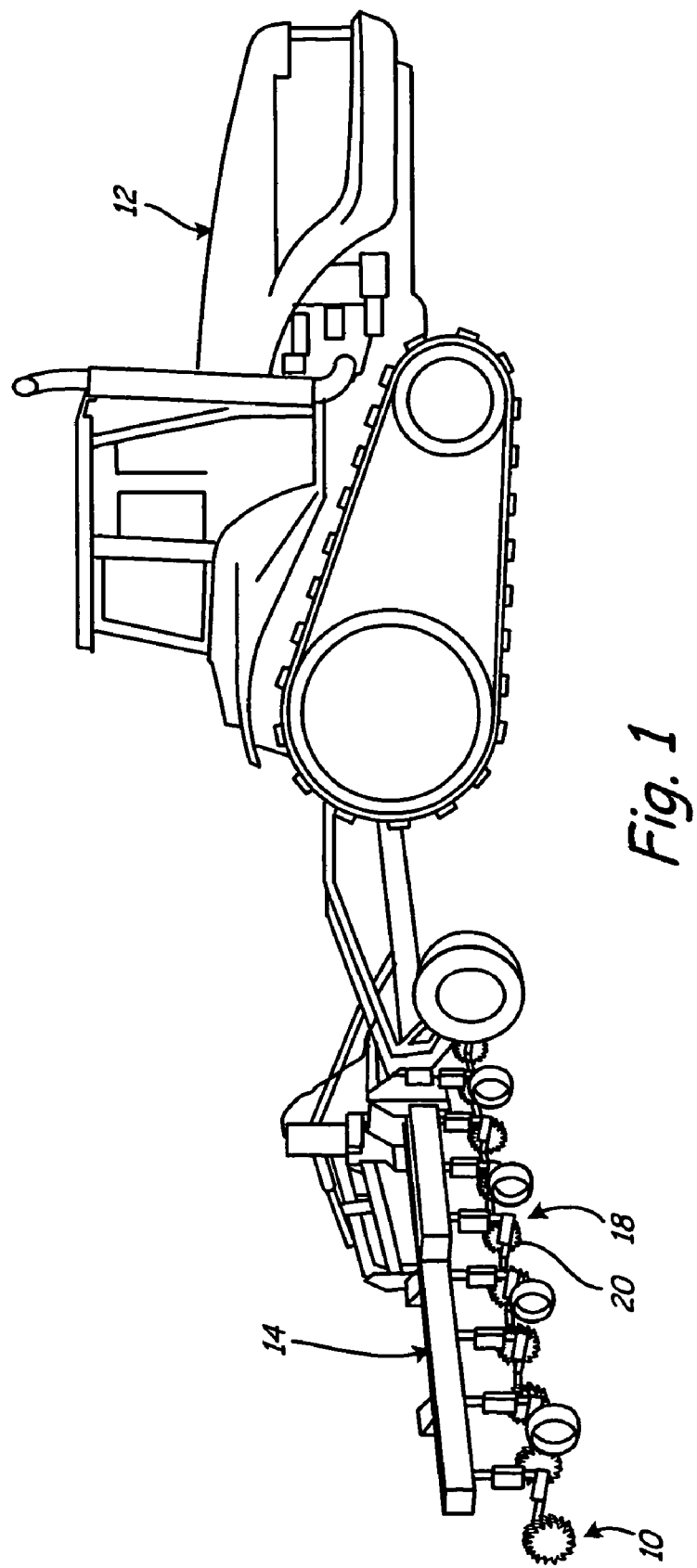
FIG. 1 is a perspective view of a crust fracturing implement of the present invention being towed by a prime mover.

A crust fracturing implement of the present invention is generally illustrated in FIG. 1 at 10. The crust fracturing implement 10 is towed by a tractor 12 or any other prime mover and fractures the crust on a field while significantly reducing if not eliminating debris from becoming entangled within discs 20 of a crust fracturing unit 18. The crust fracturing implement 10 includes a plurality of crust fracturing units 18 that typically correspond to the number of rows of a planter that was used to plant the field.

The crust fracturing implement 10 typically is a pull behind row cultivator 14 that is modified into the crust fracturing implement 10 of the present invention by removing the spring shanks (not shown) that support shovels (not shown) from each gang 15. While modifying a pull behind row cultivator 14 is typical, the crust fracturing implement 10 of the present invention may be manufactured as a separate implement or by modifying other pieces of equipment.

The shovels (not shown) are typically utilized to uproot and kill weeds that sprout up between the rows of the crops. However, the shovels tend to break up the crust into larger chunks which may uproot the young seedlings or cover the row of seedlings with additional soil which may also kill the young seedlings. Further having the shovels tilling the soil would inhibit the ground speed at which the crust fracturing implement 10 operates effectively, typically in the range of between about 5 miles per hour and about 8 miles per hour.

Figure 2:
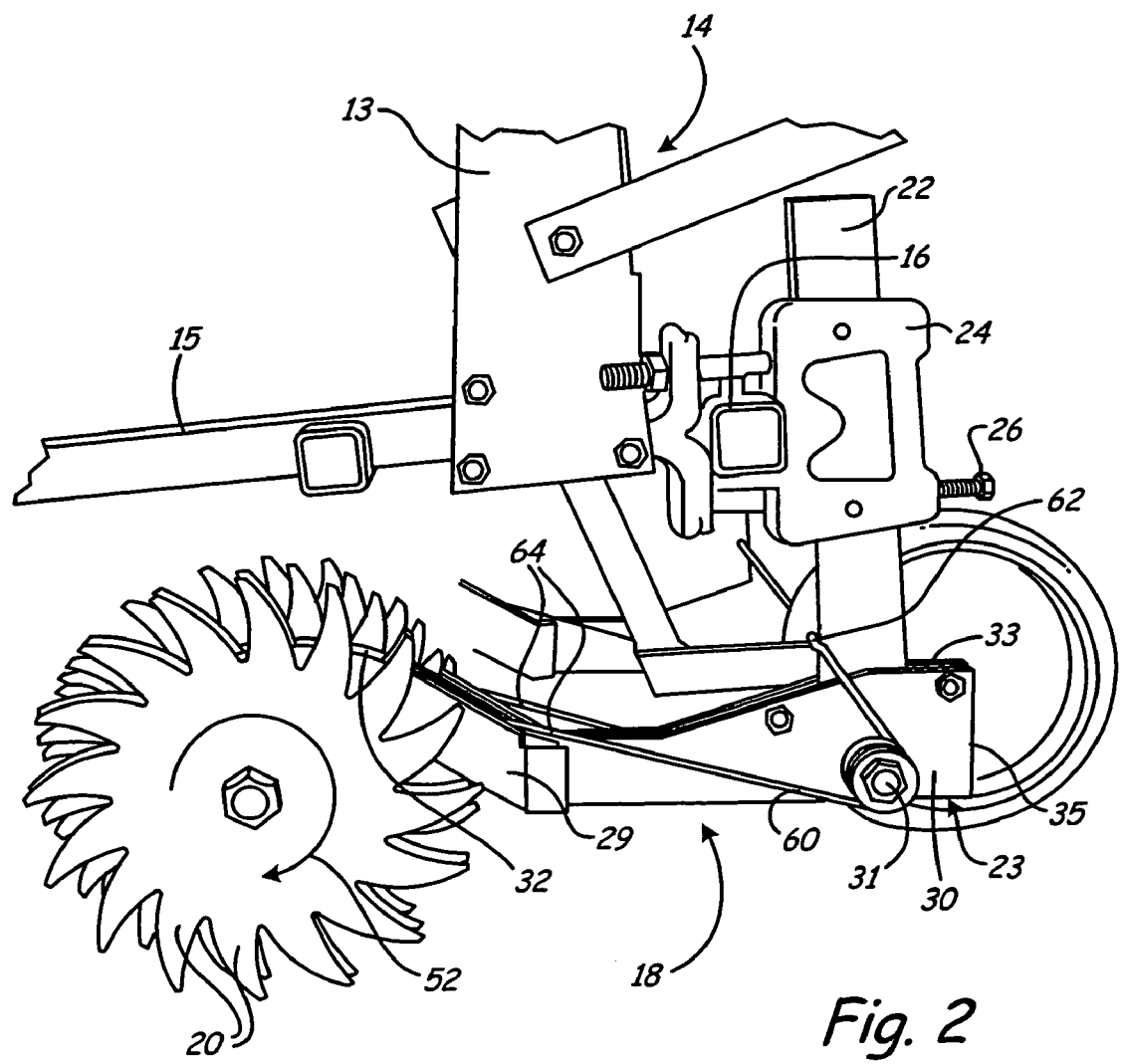
FIG. 2 is a side view of a unit of the crust fracturing implement of the present invention attached to a tool bar of a pull-behind row cultivator.
Figure 3:
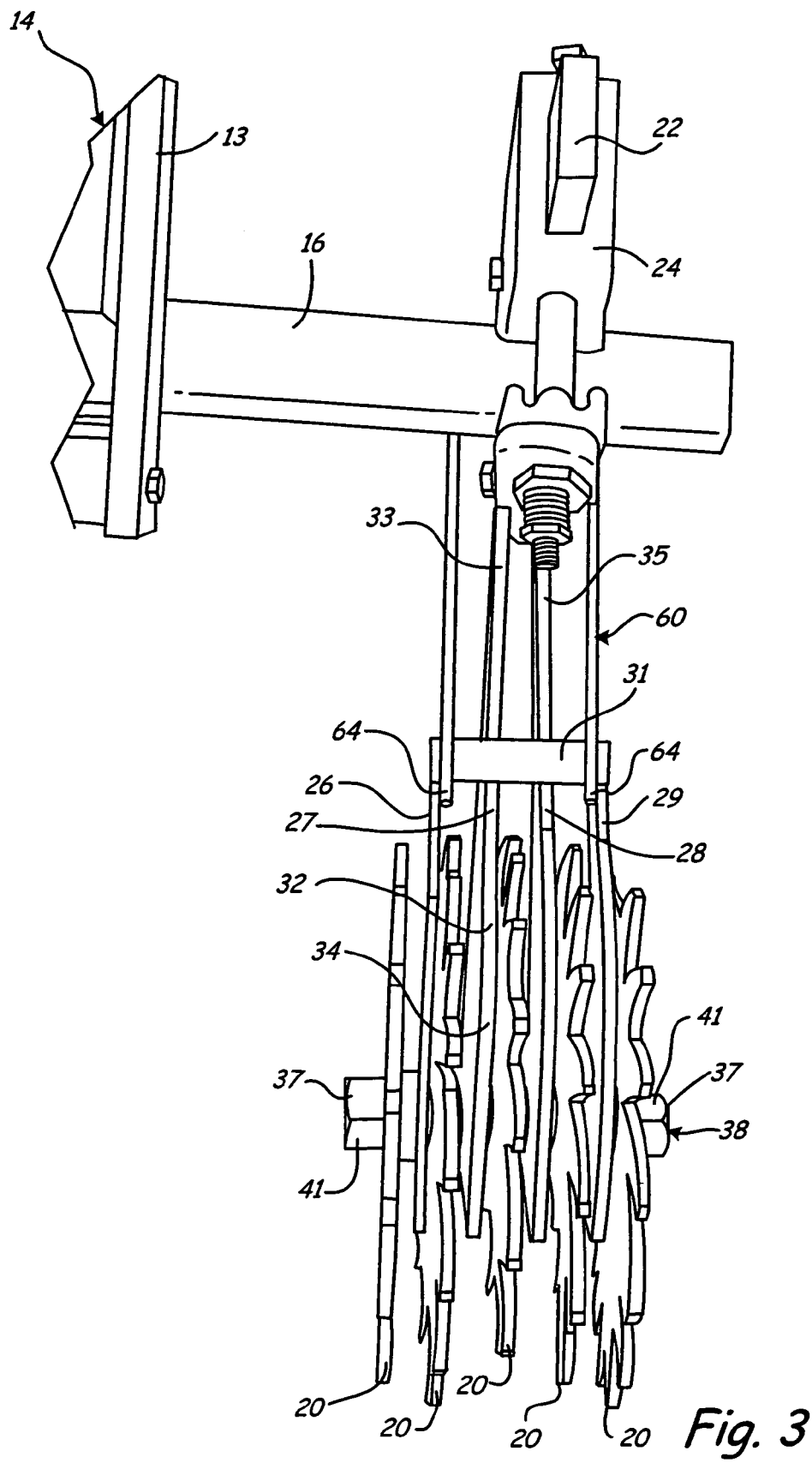
FIG. 3 is a top view of the unit of the crust fracturing implement of the present invention attached to the tool bar of the pull behind row cultivator.

Referring to FIGS. 2 and 3, each crust fracturing unit 18 is typically mounted to a tool bar 16 where the tool bar 16 is mounted to a main frame 13 of the cultivator 14. The tool bar 16 is typically secured substantially along a length of the cultivator 14 and typically supports cutting discs (not shown) that penetrate the soil proximate the rows and move the soil away from the rows and thereby uprooting weeds without harming the rows of crops. With the cutting discs removed from the tool bar 16, a substantially vertical shank 22 of a support 23 is secured within a bore in a mounting bracket 24 that previously supported the cutting discs (not shown). A typical shank 22 is a solid member having a rectangular cross-section approximately ¾" by 3" that is positioned within the bore in the mounting bracket 24. The shank 22 is secured in a selected position with a set screw 26 that threadably engages a threaded bore in the mounting bracket 24 to frictionally secure the shank 22 in the selected position. While a ¾" by 3" rectangular shank 22 is typical, any configured shank that mounts to any mounting bracket is within the scope of the present invention.

The support 23 includes left and right substantially horizontal members 33, 35 that are pivotally secured to the shank 22 with a bolt 31 positioned through aligned apertures in each of the left and right supports 33, 35 and an aperture located proximate a distal end of the shank 22. Left and right inside arms 27,28 are welded to distal ends of the members 33, 35, respectively. The arms 27, 28 have a similar configuration including an arcuate portion 32 proximate a distal end 34.

Left and right outside arms 26,29 are aligned with the left and right inside arms 27,28 and are secured in selected positions with a plate 31. The plate 31 is fixedly attached proximate the seam created by the left and right supports 33, 35 and the left and right inside arms 27, 28, respectively. Proximal ends of the left and right outside arms 26,29 are fixedly attached to the plate 31.

Figure 4:
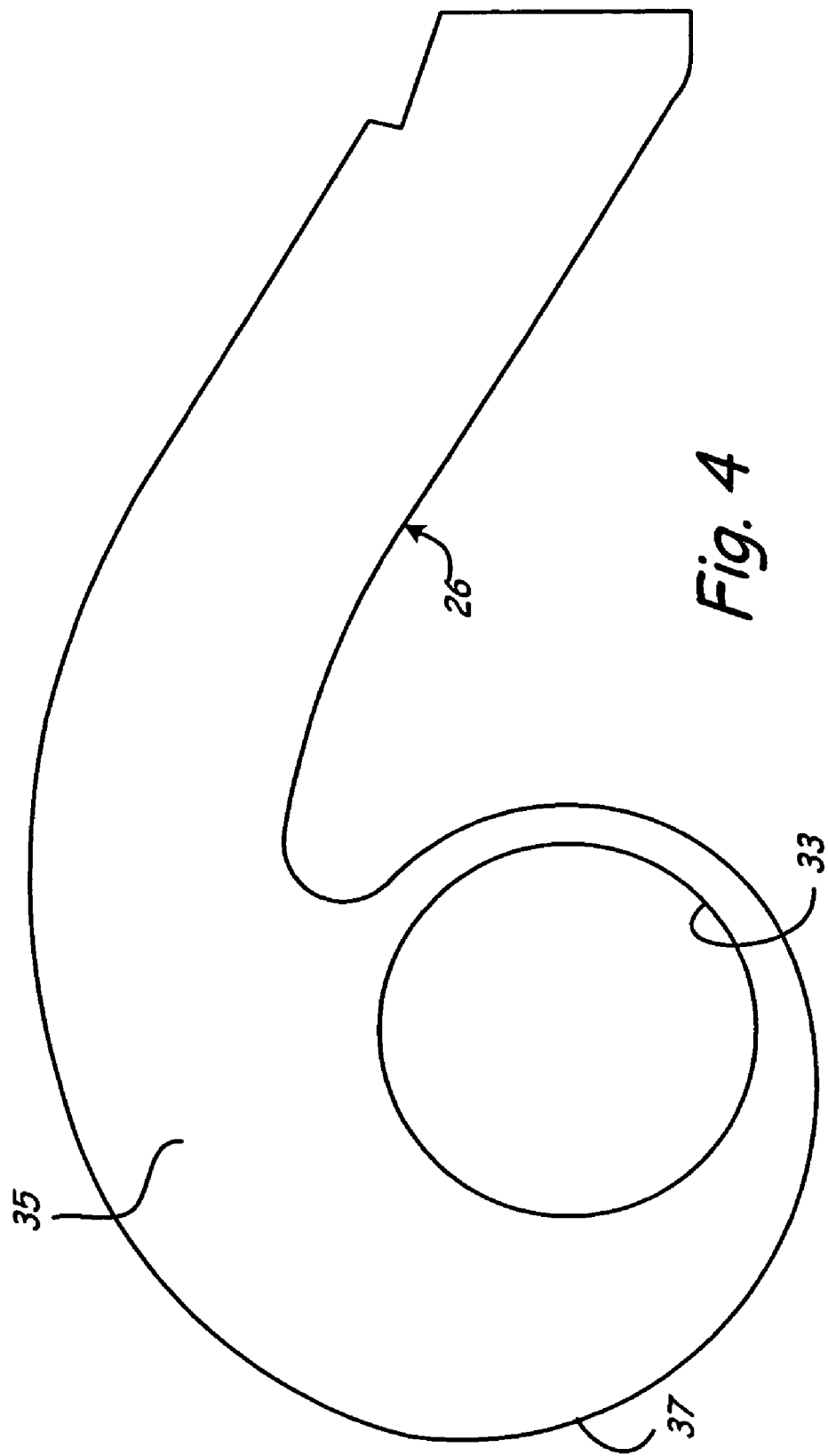
FIG. 4 is a side view of an outside arm having an angled surface for ejecting trash and debris from the discs of the crust fracturing unit of the present invention.

Referring to FIG. 4, the left and right outside arms 26,29 are similarly constructed and have the same arcuate configuration as the left and right inside arms 27,28. The outside arms 26, 29 include apertures 33 that accept bearings (not shown). The left and right arms 27,28 also include apertures that align with the apertures 33 in the left and right outside arms 26, 29.

Each arm 26, 27, 28, 29 includes a back portion that extends toward the perimeter of the discs 20. An arcuate surface 37 of the back portion 35 engages debris that is carried by the discs 20 and discharges the debris from the crust fracturing unit 18. As the discs 20 rotate, the angle created between the arcuate surface 37 and teeth 42 spaced around the disc 20 is typically between about 80° and about 130°. The relatively large angle between the arcuate surface 37 and the teeth 42 causes any debris to be discharged from the unit 18 such that the discs 20 freely rotate therein, unlike a typical rotary hoe which creates a relatively small angle between the teeth of the disc and the support which tends to bind the discs of a typical rotary hoe.

Figure 5:
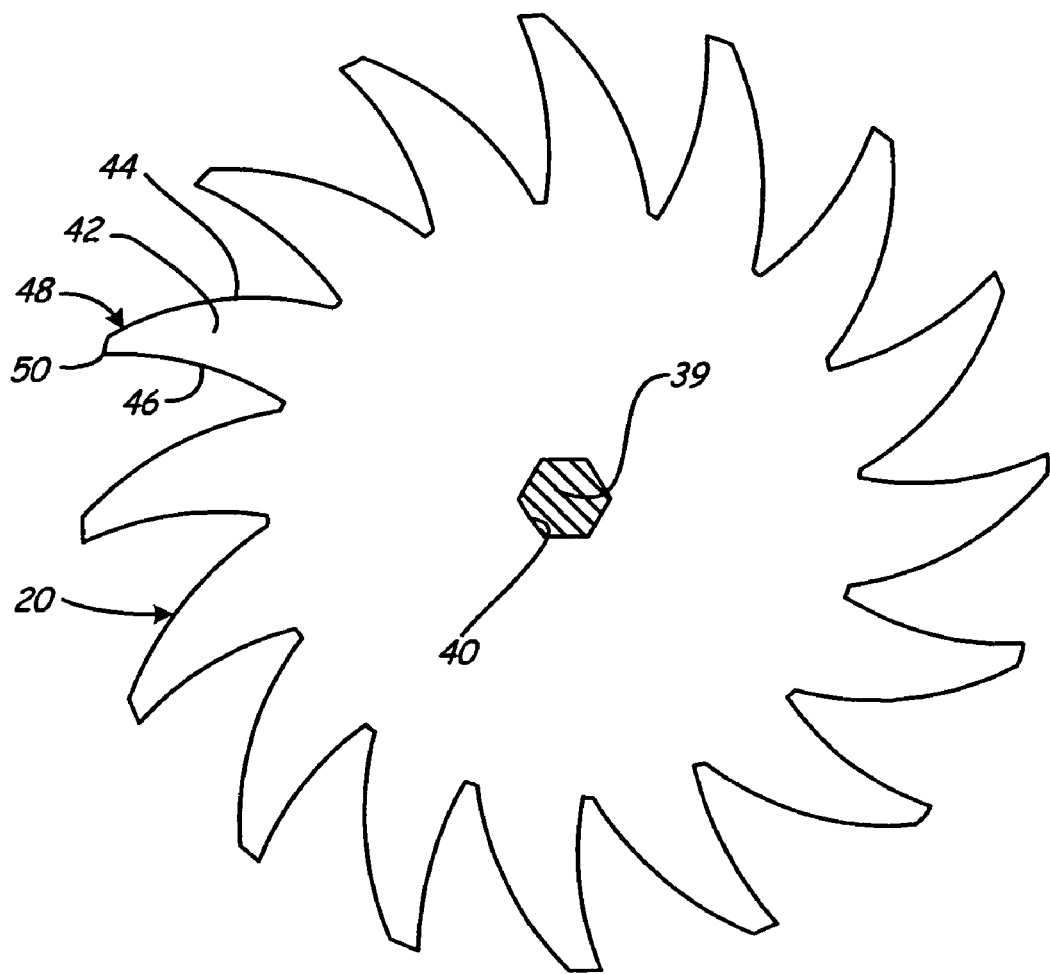
FIG. 5 is a side view of a disc of a crust fracturing unit.

Referring to FIG. 5, the discs 20 are positioned between the arms 26,27,28,29 in an alternating fashion and are retained between the arms 26,27,28,29 with an axle 38 positioned through the bearings (not shown). Preferably the axle 38 has a substantially hexagonal cross-sectioned mid portion 39 that engages a substantially hexagon-shaped aperture 40 substantially centrally located on each disc 20. The engagement of the flat surfaces on the axle 38 with the flat surfaces of the aperture 40 prevent the disc from rotating about the axle 38. While a hexagon shaped aperture 40 and axle 38 are typical, any mechanism that prevents the discs 20 from rotating on the axle 38 is within the scope of the present invention including any polygonal configuration, at least one non-arcuate surface on the shaft 38 and the aperture 40 and a weld.

The axle 38 is retained within the bearing (not shown) with a threaded engagement of nuts with threaded ends 37 of the axle 38 as best illustrated in FIGS. 2 and 3. However, other retaining mechanisms are within the scope of the present invention including a cotter pin, a roller pin, a spring loaded pin within a collar, and a bolt with a locking nut and washers.

Typically each unit 18 includes five discs 20 that are separated by the four arms 26,27,28,29. However it is within the scope of the present invention for a unit to include two or more discs and at least one arm.

Each disc 20 typically has sixteen substantially evenly spaced teeth 42 positioned about a perimeter of the disc 20. While a disc with sixteen substantially evenly spaced teeth 42 is typical a disc with more or less than sixteen teeth are within the scope of the present invention. A disc 20 with teeth having a non-uniform length are also within the scope of the present invention.

Each tooth includes a convex surface 44 and a concave surface 46 that converge at a distal end 48. Preferably the distal end 48 includes a flat or angular surface 50 that penetrates the crust substantially in a chiseling manner as the disc 20 is rotated. A typical angle of the surface includes an angle of about 15°. However a pointed distal end 48 or other configured distal ends are within the scope of the present invention.

The discs 20 are typically positioned on the shaft 38 such that only one tooth 42 penetrates the crust at one time. Staggering the position of the teeth relative to each other aids in penetrating and fracturing the crust. While only one tooth typically penetrates the crust at a time, it should be understood that more than one tooth 42 will be in the soil at any time.

The discs 20 and the axle 38 rotate in the direction of arrow 52, as illustrated in FIG. 2, such that the angular surface 50 and the convex surface 44 fracture the crust. Fracturing the crust with the convex surface 44 forces any crop debris or residue, rocks, sticks or other obstacle into the ground such that as the tooth exits the ground the debris tends to remain in the ground thereby leaving the discs to freely rotate. The combination of the angular surface 50 and the convex surface 44 engaging and penetrating the crust along with the positioning of the arms 26,27,28,29 between the discs 20 prevents debris from becoming entangled with the discs 20 such that a field can be fractured without unnecessary interruption.

Because the convex surfaces 44 of the teeth 42 engage the crust, each unit 18 must provide a sufficient amount of force for the teeth 42 to penetrate the crust. A typical unit 18 with five discs 20 and four arms 26,27,28,29 weighs about fifty pounds which in most instances will provide enough force for the angular surface 50 and the convex surface 44 to penetrate the crust.

If additional force is necessary, a coil spring 60 is positioned about the bolt 31 on each end where a proximal end 62 of the coil spring engages the shank 22 and a distal end 64 engages the plate. The coil spring 60 applies a downward force typically in the range of five to ten pounds on the discs 20 and aids the teeth 42 in penetrating the crust. However, a coil spring is not necessary to practice the present invention.

The coil spring 60 also provides the additional benefit of retaining the teeth 42 in the ground when the unit 18 contacts an obstacle. Without the coil spring 60, the unit 18 would have a tendency of raising when encountering a larger rock or clump of soil which would result in the teeth 42 disengaging the crust.

Although the present invention has been described with reference to preferred embodiments, workers skilled in the art will recognize that changes may be made in form and detail without departing from the spirit and scope of the invention.

What is claimed is:

1. An apparatus for fracturing a crust on an agricultural field comprising:
   a tool bar;
   a support for attaching to the tool bar;
   a coil spring engaging the support wherein the coil spring urges the support downward;
   an axle rotatably supported by the support proximate a distal end thereof; and
   a plurality of discs non-rotatably attached to the axle and wherein each disc comprises a plurality of spaced apart teeth about a perimeter of each disc and wherein the teeth comprise convex surfaces and concave surfaces that converge to distal ends and wherein as the plurality of discs rotate about the support, the convex surfaces penetrate and fracture the crust.

2. The apparatus of claim 1 and wherein the support comprises a plurality of arms having distal ends wherein each of the distal ends rotatably support the axle and wherein each of the arms of the plurality of arms are positioned between each of the adjacent discs of the plurality of discs.

3. The apparatus of claim 2 and wherein each plurality of arms comprise an upper convex surface having an apex that is positioned below the distal ends of the teeth.

4. The apparatus of claim 1 and wherein the coil spring engages the support and urges the plurality of discs into the crust.

5. The apparatus of claim 1 and wherein the axle comprises at least one flat surface.

6. The apparatus of claim 5 and wherein each of the plurality of discs comprises a substantially centrally located aperture having a perimeter with at least one flat surface that engages the flat surface of the axle to prevent the plurality of discs from rotating on the axle.

7. The apparatus of claim 1 and wherein the axle comprises a plurality of flat surfaces.

8. The apparatus of claim 7 and wherein each of the plurality of discs comprises a substantially centrally located aperture having a perimeter with a plurality of flat surfaces that engage the plurality of flat surfaces on the axle to prevent the plurality of discs from rotating on the axle.

9. The apparatus of claim 1 and wherein the plurality of discs are attached to the axle such that only one tooth penetrates the crust at a time.

10. The apparatus of claim 1 and wherein the plurality of discs comprises more than four discs.

11. An apparatus of claim 1 wherein the teeth comprise convex surfaces and concave surfaces that converge to distal ends comprising a flat surface and wherein as the plurality of discs rotate about the support, the convex surfaces penetrate and fracture the crust.

12. The apparatus of claim 11 and wherein the support comprises a plurality of arms having distal ends wherein each of the distal ends rotatably support the axle and where the plurality of arms are positioned in a space between each of the adjacent discs of the plurality of discs.

13. The apparatus of claim 12 and wherein each plurality of arms comprise an upper convex surface having an apex that is positioned below the distal ends of the teeth.

14. The apparatus of claim 11 and wherein the axle comprises at least one flat surface.

15. The apparatus of claim 14 and wherein each of the plurality of discs comprises a substantially centrally located aperture having a perimeter with at least one flat surface that engages the flat surface of the axle to prevent the plurality of discs from rotating on the axle.

16. The apparatus of claim 11 and wherein the plurality of discs are attached to the axle such that only one tooth penetrates the crust at a time.

17. The apparatus of claim 11 and wherein the plurality of discs comprises more than four discs.

\* \* \* \* \*

UNITED STATES PATENT AND TRADEMARK OFFICE
CERTIFICATE OF CORRECTION

PATENT NO.       : 7,624,814 B2                                          Page 1 of 1
APPLICATION NO.  : 11/343784
DATED            : December 1, 2009
INVENTOR(S)      : Trygve Skolness It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Twenty-sixth Day of October, 2010

David J. Kappos
*Director of the United States Patent and Trademark Office*